Patented Sept. 15, 1953

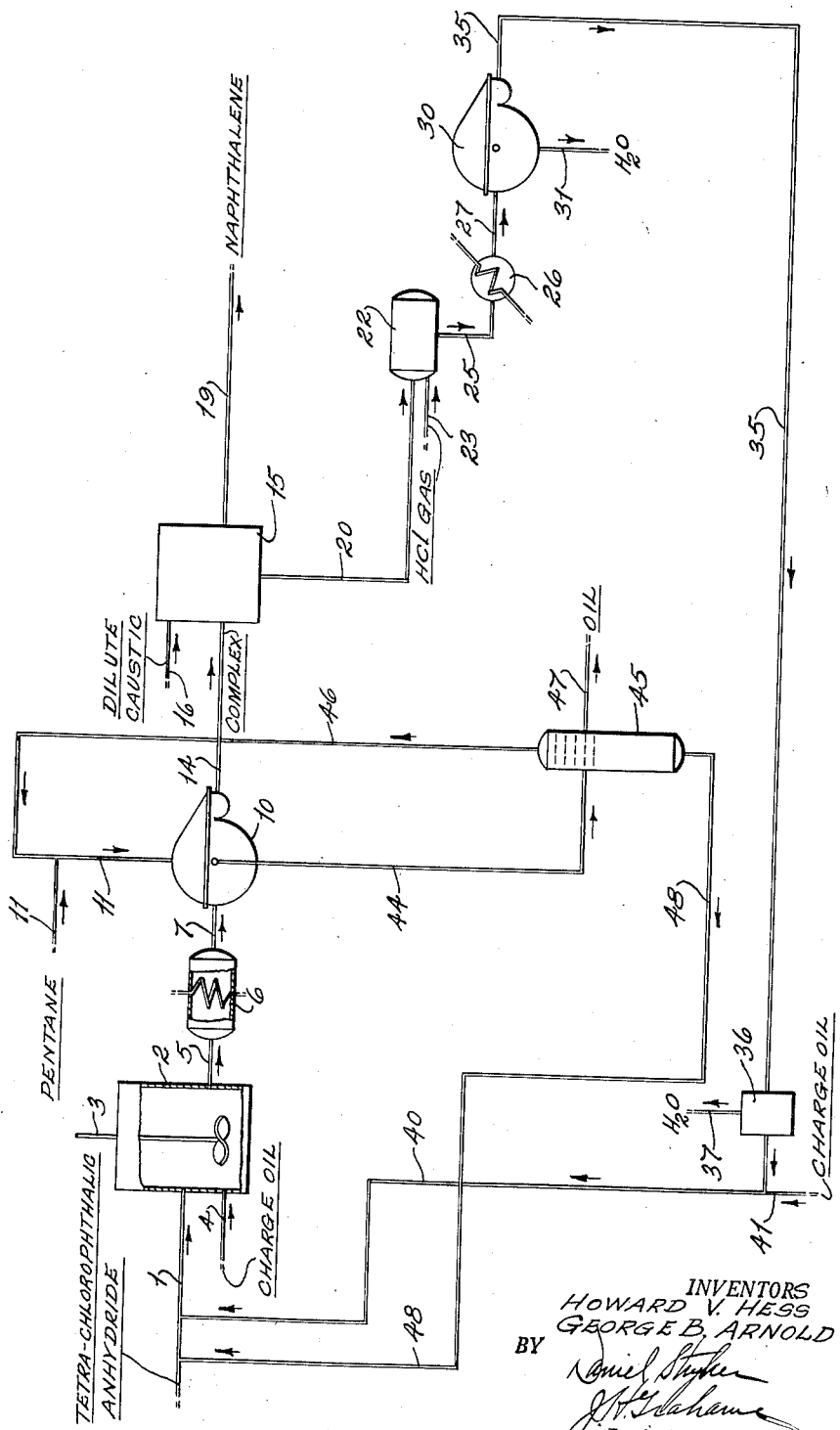

2,652,436

UNITED STATES PATENT OFFICE 2,652,436

PROCESS FOR SEPARATING POLYCYCLIC AROMATIC COMPOUNDS FROM ORGANIC MIXTURES

Howard V. Hess, Beacon, and George B. Arnold, Glenham, N. Y., assignors to The Texas Company, New York, N. Y., a corporation of Delaware Application December 7, 1949, Serial No. 131,632

9 Claims. (Cl. 260—674)

This invention relates to a process for separating polycyclic aromatic compounds from mixtures of other organic compounds. More particularly, this invention provides a method for separating polycyclic aromatics, particularly naphthalene compounds, from monocyclic aromatics and alkylated monocyclic aromatics.

The subject invention is a continuation-in-part of Serial No. 127,202, filed November 14, 1949, wherein it is disclosed that fused polycyclic aromatics, homologs and substituted derivatives of fused polycyclic aromatics can be separated from aliphatic, naphthenic, monocyclic aromatic and heterocyclic compounds by contacting organic mixtures containing polycyclic aromatics with a tetrahalophthalic anhydride whereby there are formed solid crystalline complexes comprising mol for mol quantities of fused polycyclic aromatic and tetrahalophthalic anhydride. The parent application disclosed that the solid complexes which are readily separated from the organic mixture are decomposed by heating the complex to a temperature over 200° F. The subject invention involves the additional discovery that the complex can be decomposed by dilute aqueous caustic solution in order to recover polycyclic aromatics therefrom.

In accordance with the process of this invention, polycyclic aromatics are recovered from a solid complex formed by contact of tetrahalophthalic anhydride with a polycyclic aromatic-containing organic mixture by treating with dilute aqueous caustic solution. Treatment of the tetrahalophthalic anhydride-polycyclic aromatic complex with dilute caustic results in the decomposition of the complex into polycyclic aromatics and a sodium salt of tetrahalophthalic acid which latter is dissolved in the aqueous caustic phase. Decomposition of the complex with dilute caustic solution is advantageously effected at temperatures above 50° F.

The process of the subject invention is particularly useful in separating naphthalene from monocyclic and alkylated monocyclic aromatic compounds. Naphthalene is an extremely important chemical of commerce and is in demand as a starting chemical for the production of phthalic anhydride and specialty solvents, such as, tetralin and decalin. Naphthalene itself has widespread use as a component of moth killing compositions. Heretofore, the main source of naphthalene has been coal tar. The recent huge increase in the use of alkyd resins of the phthalate type and in the use of vinyl plasticizers of the phthalate ester type has created a huge demand for naphthalene. It is well known that certain cycle oils from thermal and catalytic cracking contain substantial quantities of naphthalene. However, its isolation therefrom has been difficult to achieve, since the normal modes of mixture resolution, such as, solvent extraction, azeotropic distillation and crystallization, do not effect satisfactory separation of naphthalenes from alkylated monocyclic aromatics having boiling points similar to naphthalene. This invention provides a method whereby naphthalene can be separated very simply and efficiently from cycle cracking oils. Naphthalene and homologs thereof separated by the process of this invention are of high purity and substantially free from alkylated monocyclic aromatics since tetrahalophthalic anhydride is a specific complexing agent for polycyclic aromatic compounds.

Tetrachlorophthalic anhydride, tetrabromophthalic anhydride, tetraiodophthalic anhydride and tetrafluorophthalic anhydride or mixtures thereof may be employed as the complexing agent in the process of this invention. Tetrachlorophthalic anhydride is ordinarily employed, however, since it is the most available and the cheapest of the tetrahalophthalic anhydrides. In further description of the invention, tetrachlorophthalic anhydride will ordinarily be used to exemplify the process of the invention.

The process of the application is applicable to the separation of polycyclic aromatics other than naphthalene from mixtures of organic compounds. For example, anthracene and phenanthrene form complexes with tetrahalophthalic anhydride. Moreover, homologs of polycyclic aromatic compounds, for example, methylnaphthalene and ethylphenanthrene, and substituted polycyclic aromatics, for example alpha-chloronaphthalene, naphthol and anthraquinone, can be separated from mixtures of organic compounds by the process of the invention. Tetrahalophthalic anhydrides are specific complexing agents for polycyclic aromatics, homologs and derivatives thereof. They do not form complexes with heterocyclics, fused heterocyclics, such as dithienyl, aliphatics, monocyclic aromatics or homologs of monocyclic aromatics. The polycyclic aromatics which complex with tetrahalophthalic anhydride are of the fused type. Polycyclic aromatics of the linear type, such as diphenyl, do not form complexes with tetrahalophthalic anhydride.

The separation of polycyclic aromatics from mixtures wherein they are dissolved is effected by a simple procedure involving contacting the mixture with tetrahalophthalic anhydride, separation of the formed complex and decomposition of the complex into its components.

The contacting step is effected with thorough mixing of the complexing agent and the mixture containing polycyclic aromatic compounds. A preferred method of insuring thorough contacting of the complexing agent with the polycyclic aromatic compounds is to contact the organic mixture with complexing agent at a temperature above 300° F. and preferably at a temperature between 325 and 400° F.; at these temperatures the complexing agent is soluble in most hydrocarbon mixtures. Thorough mixing in contacting the complexing agent with the polycyclic aromatic compounds is efficiently realized by dissolving the complexing agent in the hydrocarbon mixture. Upon cooling the mixture to a temperature between 50 and 150° F., a complex of polycyclic aromatics and tetrachlorophthalic anhydride separates out as a golden yellow solid.

It is also feasible to effect complex formation by slurrying solid tetrachlorophthalic anhydride with thorough agitation in a polycyclic-containing mixture at atmospheric temperature. In such instances, longer contact time and more vigorous agitation is required in order to effect the same degree of separation that is effected by the procedure involving solution of the complexing agent at elevated temperature.

A third alternative involves liquid-liquid contact and comprises contacting a saturated solution of a complexing agent in a solvent, such as acetone, with the polycyclic aromatic-containing mixture. A drawback attendant on the use of the liquid-liquid type system is that presence of the solvent introduces a third component into the system whose recovery necessitates additional treating steps.

The complex is readily separated from the mixture of organic compounds. Filtration, decantation or centrifugal separators may be used to effect removal of the complex from the treated mixture. Filtration is the most commonly used method for effecting this separation. In large scale operations rotary filters, such as are employed in solvent dewaxing procedures employing methylethylketone-benzol solvent, provide a very efficient means for separating the complex from the treated mixture. Separation of the complex from the treated mixture is ordinarily effected at a temperature below about 150° F.; temperatures between about 50 and 125° F. have proven to be particularly effective for this separation.

After separation has been effected, it is advisable to wash the precipitate with a light hydrocarbon solvent, for example, light naphtha in order to remove physically absorbed organic compounds from the complex. Pentane is an excellent wash solvent.

The separated complex is decomposed by contacting it with dilute aqueous caustic whereby there are formed polycyclic aromatics and a salt of tetrahalophthalic acid which is formed by the hydrolysis and neutralization of the anhydride with dilute caustic. Aqueous solutions of alkali metal hydroxides such as sodium hydroxide or alkali metal salts such as potassium carbonate may be employed to decompose the complex. The aqueous caustic solution employed for recovering polycyclic aromatics from the complex can vary in concentration from about 1 to 20 per cent. However, it has been found that best results are obtained when solutions of 2 to 10 weight per cent concentration are employed.

It is advisable to decompose the complex with aqueous caustic solution at a temperature of 50° F. or above. It has been found that excellent recovery of polycyclic aromatics from the complex is realized when the complex is decomposed at temperatures falling between 75 and 125° F. but temperatures as high as 200° F. can be employed.

Contacting the complex with dilute caustic results in the formation of a two phase liquid system of which the upper layer consists of polycyclic aromatics and the lower layer consists of aqueous caustic containing dissolved therein a salt of tetrahalophthalic acid. The polycyclic aromatics are substantially insoluble in the dilute aqueous caustic solution and are readily separated therefrom. The polycyclic aromatic obtained in this fashion can be dried by conventional means such as contact with a desiccant or by azeotropic distillation. These polycyclic aromatics are of high purity.

Tetrahalophthalic anhydride can be generated from the dilute caustic solution by a procedure involving neutralization, filtration and dehydration of the acid to anhydride. Concentrated acid, preferably hydrochloric acid is used to neutralize the caustic solution and spring tetrahalophthalic acid from its sodium salt. Dilute acid can be used but its use is not recommended because of the resulting large volumes. Gaseous HCl and concentrated sulfuric can also be used to effect the neutralization. After neutralization the aqueous slurry of tetrahalophthalic acid is cooled to a temperature between 45 and 70° F. at which temperature the acid is substantially insoluble in water. Thereafter the slurry is filtered and the separated tetrahalophthalic acid is dehydrated by heating to a temperature above 220° F. or by azeotroping benzene, toluene, etc. The anhydride is formed by dehydration and is recycled in order to contact further quantities of polycyclic aromatic-containing mixtures.

In the accompanying drawing there is presented a flow diagram of a preferred procedure for effecting the process of the subject invention. For purposes of explanation, the process is applied to the separation of naphthalene from an oil such as cracked distillate.

Through pipe 1 tetrachlorophthalic anhydride is introduced into a mixing vessel 2 fitted with stirring means represented by propeller 3. In the mixing vessel 2, the complexing agent is contacted with charge oil which is introduced therein through a line 4. The mixing vessel 2 is maintained at a temperature of about 350° F. at which temperature tetrachlorophthalic anhydride dissolves in the cycle oil from which naphthalenes are to be separated.

After thorough mixing in the mixing vessel 2 the composite mixture of complexing agent and charge oil is introduced through a pipe 5 into a cooling vessel 6 wherein the treated mixture is cooled to a temperature below 150° F. and a solid complex of tetrachlorophthalic anhydride and naphthalenes settles out. The composite mixture advantageously at a temperature of about 50 to 150° F. is introduced through a pipe 7 into a rotary filter 10, wherein the complex is separated from the treated mixture by filtration. Means are provided in the rotary filter for continuous removal of the complex from the filter drum. Means are also provided for continual washing of the complex cake on the filter drum with a hydrocarbon solvent, for example pentane, which is introduced into the rotary filter through a pipe 11. This complex is removed from the rotary filter 10 through a conduit 14 which can be equipped with a screw type conveyor in order to facilitate movement of complex therethrough.

The complex is introduced into a vessel 15 wherein it is contacted with a dilute caustic solution, such as 5 per cent sodium hydroxide, which is introduced therein through a pipe 16. The complex is contacted with 5 per cent sodium hydroxide at a temperature above 50° F. in the vessel 15 which acts as a contactor and settler. Two liquid phases are formed by this treatment, when the temperature of caustic treatment is above about 170° F. The upper phase comprising naphthalene is withdrawn from the vessel 15 through a pipe 19 and is passed therethrough either to storage or to further chemical reaction. When the caustic treatment is effected at lower temperatures, naphthalene is freed from the complex in solid form; in such instance, provision is made to filter the naphthalene from the caustic solution.

The lower phase consisting of caustic solution containing dissolved sodium tetrachlorophthalic acid is withdrawn from the vessel 15 through pipe 20 and is introduced into a vessel 22 wherein neutralization of the caustic solution is effected by dry HCl gas, which is introduced into the vessel 22 through a pipe 23. After neutralization of the caustic solution, the neutralized aqueous solution is withdrawn from the vessel 22 through a pipe 25 and is introduced into an exchanger 26 wherein the temperature of the aqueous solution is reduced to a temperature between 45 and 70° F. and preferably to a temperature between 50 and 60° F.

The cooled solution is then introduced into a rotary filter 30 through pipe 27 wherein tetrachlorophthalic acid is separated from the aqueous slurry by filtration. The filtrate is removed from the filter 30 through pipe 31. This filtrate can be discarded: it can also be made alkaline and recycled in part to break further quantities of complex in the vessel 15. Means are provided in the rotary filter for continual removal of the tetrachlorophthalic acid from the filter drum. Tetrachlorophthalic acid is removed from the rotary filter 30 through a conduit 35 which can be equipped with a screw type conveyor in order to facilitate movement of the acid therefrom. Thereafter, the acid is introduced into a drying tower 36 wherein the acid is dehydrated to the anhydride. Water obtained from the dehydration is removed from the drying tower 36 through a pipe 37.

Tetrachlorophthalic anhydride obtained by dehydration of the acid is recycled through line 40 to a mixing vessel 2 for further contact with naphthalene-containing organic mixtures. The anhydride can be moved through the conduit 40 as a solid by means of screw type conveyors. It is also possible to employ hot charge oil at a temperature over 300° F. as a solvent carrier for recycle of the tetrachlorophthalic anhydride. The use of charge oil for this purpose is illustrated by introduction of charge oil into the conduit 40 through pipe 41.

The filtrate obtained from filter 10 comprises cracked distillate substantially free from naphthalene; it is withdrawn from the rotary filter 10 through a pipe 44 and is introduced into a fractionating tower 45. The wash liquid obtained by washing complex with pentane is combined with the filtrate and also flows into the fractionating tower 45 through a pipe 44. Combined filtrate and pentane wash contain a small amount of dissolved tetrachlorophthalic anhydride which can be separated therefrom by simple fractionation since the anhydride has a very high boiling point and is heat stable. On fraction of the combined filtrate and pentane wash, there is obtained a pentane fraction which is recycled to the filter 10 through pipe 46. An oil fraction substantially free of polycyclic aromatics is withdrawn from the fractionating tower 45 through a pipe 47. Tetrachlorophthalic anhydride is withdrawn from the lower portion of the fractionating tower 45 through a pipe 48 and is recycled therethrough to the mixture vessel 2. Charge oil may also be used to recycle tetrachlorophthalic anhydride recovered from the naphthalene-free oil by the aforedescribed fractionation procedure.

It is also possible to free the combined filtrate and pentane wash of dissolved tetrachlorophthalic anhydride by washing with dilute caustic. However, simple fractionation procedure is preferred for commercial operation.

The following example illustrates recovery of naphthalene from cracked distillate by the process of this invention.

*Example I*

A cracked distillate having a gravity of 0.8540 and having a total aromatic content of 50 weight per cent, of which naphthalene comprises 11 weight per cent and methylnaphthalenes comprise about 2 per cent, and tetrachlorophthalic anhydride were mixed in the proportion of 264 pounds of tetrachlorophthalic anhydride to one barrel of cracked distillate. The composite was heated to a temperature of 350° F. and thoroughly agitated. Thereafter, the composite mixture was cooled to a temperature below 150° F. whereupon a complex precipitated out; the mixture was filtered at about 90° F. and the precipitate was pentane washed. From the filtration there was obtained 285 pounds of precipitate per barrel of cracked distillate which analyzed 11.5 per cent naphthalenes. This precipitate was contacted with a sodium hydroxide water solution in the proportion of 206 pounds of sodium hydroxide to one barrel of cracked distillate. The caustic treatment of the complex resulted in the formation of two liquid layers, the upper comprising naphthalenes and the lower layer consisting of an aqueous caustic solution containing sodium salt of tetrachlorophthalic acid. The two phase liquid solution was separated and there was obtained 23.2 pounds of naphthalenes per barrel of cracked distillate. This naphthalene fraction contained 95 per cent naphthalene, 4 per cent alphamethyl naphthalene and 1 per cent beta-methylnaphthalene. The filtrate and pentane wash were combined, caustic washed and stripped. 37.8 gallons of oil per barrel of cracked distillate was obtained which contained no appreciable quantity of naphthalene. The oil treated in this way contained approximately 1.50 per cent tetrachlorophthalic anhydride; this oil can be further freed from tetrachlorophthalic anhydride by fractional distillation.

The high purity of the naphthalene isolated from the cracked distillates in the preceding example is outstanding; the naphthalene cut contains approximately 100 per cent napthalene plus methylnaphthalenes.

Moreover, it is apparent that the process of the invention can be used either to isolate a valuable component, such as naphthalene from a refinery stream or to free a petroleum fraction of polycyclic aromatics where their presence is detrimental to the intended use of the hydrocarbon fraction.

Obviously many modifications and variations of the invention, as hereinbefore set forth, may be made without departing from the spirit and scope thereof, and therefore only such limitations should be imposed as are indicated in the appended claims.

We claim:

1. A process for recovering fused polycyclic aromatic compounds, homologs and substituted derivatives thereof from mixtures containing such compounds in combination with similar boiling hydrocarbons which comprises contacting said mixture with tetrahalophthalic anhydride, forming a complex consisting mainly of said tetrahalophthalic anhydride and said fused polycyclic aromatic compounds, separating said complex in solid form at a temperature below 150° F. and decomposing said complex by dilute caustic solution to recover said fused polycyclic aromatics therefrom.

2. A process according to claim 1 in which tetrachlorophthalic anhydride is employed as the complexing agent.

3. A process according to claim 1 in which the complex is decomposed by contact with dilute caustic at a temperature above 50° F.

4. A process according to claim 1 in which 1 to 20 per cent caustic solution is employed to decompose the complex.

5. A process according to claim 1 in which contact of tetrahalophthalic anhydride with fused polycyclic aromatic-containing mixture is effected by dissolving the tetrahalophthalic anhydride in the mixture at temperatures above 300° F. and thereafter cooling the mixture to a temperature below about 150° F.

6. A process for recovering fused polycyclic aromatic compounds and homologs thereof from mixtures containing such compounds in association with monocyclic aromatic hydrocarbons of similar boiling point, which comprises contacting said mixture with tetrahalophthalic anhydride at a temperature above 300° F., cooling said mixture to a temperature below 150° F. whereby a solid complex consisting mainly of said tetrahalophthalic anhydride and said fused polycyclic aromatic compounds is formed, separating said solid complex and decomposing said solid complex by dilute caustic solution to recover said fused polycyclic aromatics therefrom.

7. A process according to claim 6 in which the complex is decomposed with dilute caustic at a temperature above 50° F.

8. A process according to claim 6 in which the complex is decomposed with 1 to 20 per cent caustic solution at a temperature above 50° F.

9. A process for recovering naphthalene and its homologs from a mixture containing said naphthalene compounds in association with alkylated monocyclic aromatic compounds of similar boiling point which comprises contacting said mixture with tetrahalophthalic anhydride at a temperature above 300° F., cooling said mixture to a temperature below 150° F. whereby a solid complex consisting of said tetrahalophthalic anhydride and said naphthalene compounds is formed, separating said solid complex and contacting said solid complex with 1 to 20 per cent dilute caustic solution whereby said complex is decomposed into said naphthalene compounds and a salt of tetrahalophthalic acid.

HOWARD V. HESS.
GEORGE B. ARNOLD.

References Cited in the file of this patent

UNITED STATES PATENTS

| Number | Name | Date |
|---|---|---|
| 2,347,228 | Winans | Apr. 25, 1944 |
| 2,440,688 | Insinger | May 4, 1948 |
| 2,489,042 | Medcalf et al. | Nov. 22, 1949 |

OTHER REFERENCES

Pfeiffer et al.: Berichte 55B, 413–29 (1922), abstracted in Chem. Abstracts, vol. 16, 2483–4 (1922).